J. TREGURTHA.
Dissolving Apparatus.

No. 227,396.          Patented May 11, 1880.

WITNESSES
A. J. Oettinger
M. W. Sawyer

INVENTOR
James Tregurtha
by his attys
Charles & Raymond

United States Patent Office.

JAMES TREGURTHA, OF BOSTON, ASSIGNOR TO CHASE, MERRITT & BLANCHARD, OF SAME PLACE, AND WALTER N. DOLE, AGENT, OF LYNN, MASSACHUSETTS.

DISSOLVING APPARATUS.

SPECIFICATION forming part of Letters Patent No. 227,396, dated May 11, 1880.

Application filed February 16, 1880.

*To all whom it may concern:*

Be it known that I, JAMES TREGURTHA, a subject of the Queen of Great Britain, residing in Boston, in the county of Suffolk and State of Massachusetts, have invented an Improvement in Dissolving Apparatus, of which the following is a specification.

My invention relates to apparatus for dissolving large quantities of india-rubber or gutta-percha in any of their known solvents thoroughly and rapidly, and it embraces an agitating device arranged within a tank or vat, and, when gutta-percha is used, means for heating the mixture during the agitation.

When an evaporative solvent, like naphtha, is used, it is necessary that the mingling of the rubber or gutta-percha therewith be done in a close tank.

Reference is made to the drawings forming a part of this specification in explaining the nature of this invention, in which—

Figures 1, 2:
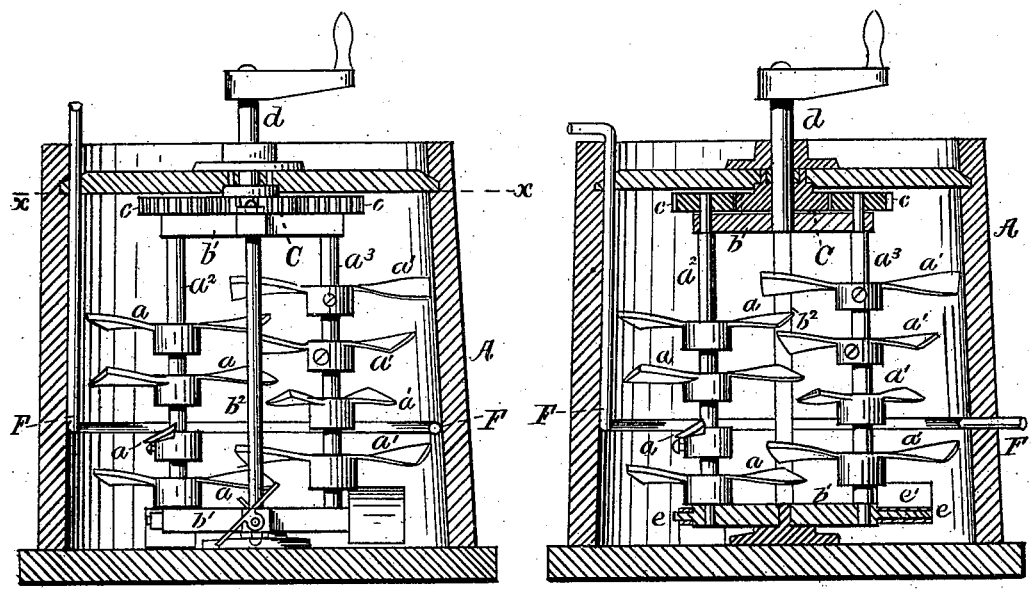
Figure 3:
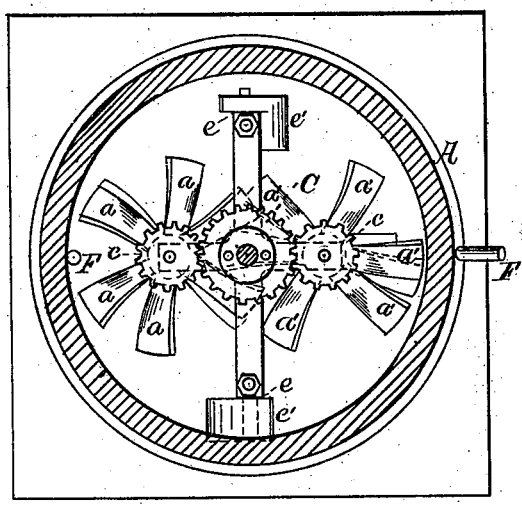

Figure 1 is a vertical section of the tank and an elevation of the mixing apparatus. Fig. 2 represents a section of the tank and the mixing apparatus, partly in section and partly in elevation. Fig. 3 is a cross-section on the line $x\ x$ of Fig. 1.

A represents the vat or tank, which is adapted to be tightly closed during the dissolving process. It is provided with a suitable opening at the top, for introducing the material to be mingled, and with an outlet at the bottom, for drawing off the product.

The mixing device or agitator embraces two series of revolving blades, $a\ a'$, fastened to their respective shafts $a^2\ a^3$, and they are adapted to be revolved thereby, and also to be moved around the vat or tank in a circle having a center midway between the shafts.

The mixing-blades preferably are sharpened upon their working or front edge, and are slightly curved or inclined to a horizontal plane, and they are arranged upon each shaft to overlap or extend beyond each other during their revolution in such a manner that those on one shaft pass beneath those on the other as they revolve with their shafts.

The shafts have bearings in the frames $b\ b'$, which are connected by rods $b^2$, and the upper frame is keyed to the main shaft.

Each shaft has a gear-wheel, $c$, which engages with the gear-wheel C, and the main shaft $d$, which extends from without the tank through the upper frame, serves to revolve it and the gears $c$ upon the two shafts $a^2\ a^3$, and as they revolve around the stationary gear C they serve to revolve the agitating-arms while they are moving around the tank.

There are attached to the lower part of the frame arms $e$, bearing scraping devices $e'$, which are inclined to the plane at the bottom of the vat, and which are so arranged in relation to each other that, acting together, they scrape the upper surface of the bottom of the vat and raise any deposit to the action of the beaters above.

The inclined surface of the beaters also assists in lifting the heavier portions of the composition toward the upper part of the tank, so that the dissolving and intermixing of the solvent with the rubber or gutta-percha is more easily and thoroughly accomplished.

When gutta-percha is used it is essential that the solvent be heated; and for this purpose I arrange within the tank a coil, F, through which steam or hot air may be passed.

Of course any other desirable method of applying heat to the mixture by means of steam or heat passed through pipes which enter the tank may be employed.

I do not intend to confine myself in the use of the apparatus herein described to mixing rubber or gutta-percha with a solvent, but may use it for dissolving or mixing any compound.

Having thus fully described my invention, I claim and desire to secure by Letters Patent of the United States—

1. The combination of a covered tank with the revolving mixing-blades $a\ a'$, arranged to be moved in the tank around a center midway between their supporting-shafts, substantially as described.

2. The combination, in a covered tank, of the revolving blades arranged upon a moving support with the scraping-blades $e'$, substantially as and for the purposes described.

3. The combination, in a covered tank, of a mixing device consisting of revolving blades arranged to be moved in the tank around a center midway between their supporting-shafts, and means for applying heat to the tank, substantially as and for the purpose set forth.

JAMES TREGURTHA.

Witnesses:
F. F. RAYMOND, 2d,
A. J. OETTINGER.